United States Patent
Dadu et al.

(10) Patent No.: US 9,761,116 B2
(45) Date of Patent: Sep. 12, 2017

(54) LOW POWER VOICE TRIGGER FOR FINDING MOBILE DEVICES

(71) Applicant: Intel Corporation, Santa Clara, CA (US)

(72) Inventors: Saurabh Dadu, Tigard, OR (US); Lakshman Krishnamurthy, Portland, OR (US); Brian Vogel, Santa Clara, CA (US); Swarnendu Kar, Hillsboro, OR (US); Pierre-Louis Bossart, Austin, TX (US); Bryan Peebler, Folsom, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 15/405,960

(22) Filed: Jan. 13, 2017

(65) Prior Publication Data

US 2017/0132904 A1    May 11, 2017

Related U.S. Application Data

(63) Continuation of application No. 14/124,825, filed as application No. PCT/US2013/059112 on Sep. 11, 2013, now Pat. No. 9,582,983.

(51) Int. Cl.
*G08B 21/24* (2006.01)
*H04M 1/725* (2006.01)
*H04W 52/02* (2009.01)

(52) U.S. Cl.
CPC .......... *G08B 21/24* (2013.01); *H04M 1/7253* (2013.01); *H04M 1/72563* (2013.01); *H04W 52/0229* (2013.01); *H04M 2250/74* (2013.01)

(58) Field of Classification Search
CPC ................ G08B 21/24; H04M 1/7253; H04M 2250/74; H04W 52/0229
See application file for complete search history.

(56) References Cited

U.S. PATENT DOCUMENTS

2007/0077924 A1   4/2007  Bhogal et al.
2008/0186162 A1   8/2008  Rajan et al.
(Continued)

FOREIGN PATENT DOCUMENTS

| KR | 1020130014473 A | 2/2013 |
| WO | 2015005927 A1 | 1/2015 |
| WO | 2015034504 A1 | 3/2015 |

OTHER PUBLICATIONS

International Search Report and Written Opinion for International Patent Application No. PCT/US2013/059112, mailed Jun. 24, 2014, 11 pages.

(Continued)

*Primary Examiner* — Brian Zimmerman
*Assistant Examiner* — Sara Samson
(74) *Attorney, Agent, or Firm* — Jordan IP Law, LLC

(57) ABSTRACT

Systems and methods may provide for monitoring an input audio signal from an onboard microphone of a mobile device while a host processor of the mobile device is in a standby mode. Additionally, a predetermined audio pattern may be identified in the input audio signal and a device location session may be triggered with respect to the mobile device based on the predetermined audio pattern. In one example, an output audio signal is generated during the device location session.

26 Claims, 6 Drawing Sheets

(56) References Cited

U.S. PATENT DOCUMENTS

| | | |
|---|---|---|
| 2010/0076968 A1 | 3/2010 | Boyns et al. |
| 2010/0207781 A1 | 8/2010 | Shuster |
| 2010/0315236 A1 | 12/2010 | Sakargayan |
| 2012/0196571 A1* | 8/2012 | Grkov .................... H04L 63/14 455/411 |
| 2012/0258701 A1* | 10/2012 | Walker ................... H04W 4/16 455/419 |
| 2013/0260784 A1 | 10/2013 | Lutz |
| 2014/0149122 A1 | 5/2014 | Zhang |
| 2014/0274211 A1* | 9/2014 | Sejnoha ............ H04M 1/72519 455/563 |

OTHER PUBLICATIONS

International Preliminary Report on Patentability for International Patent Application No. PCT/US2013/059112, mailed Aug. 7, 2015, 12 pages.

* cited by examiner

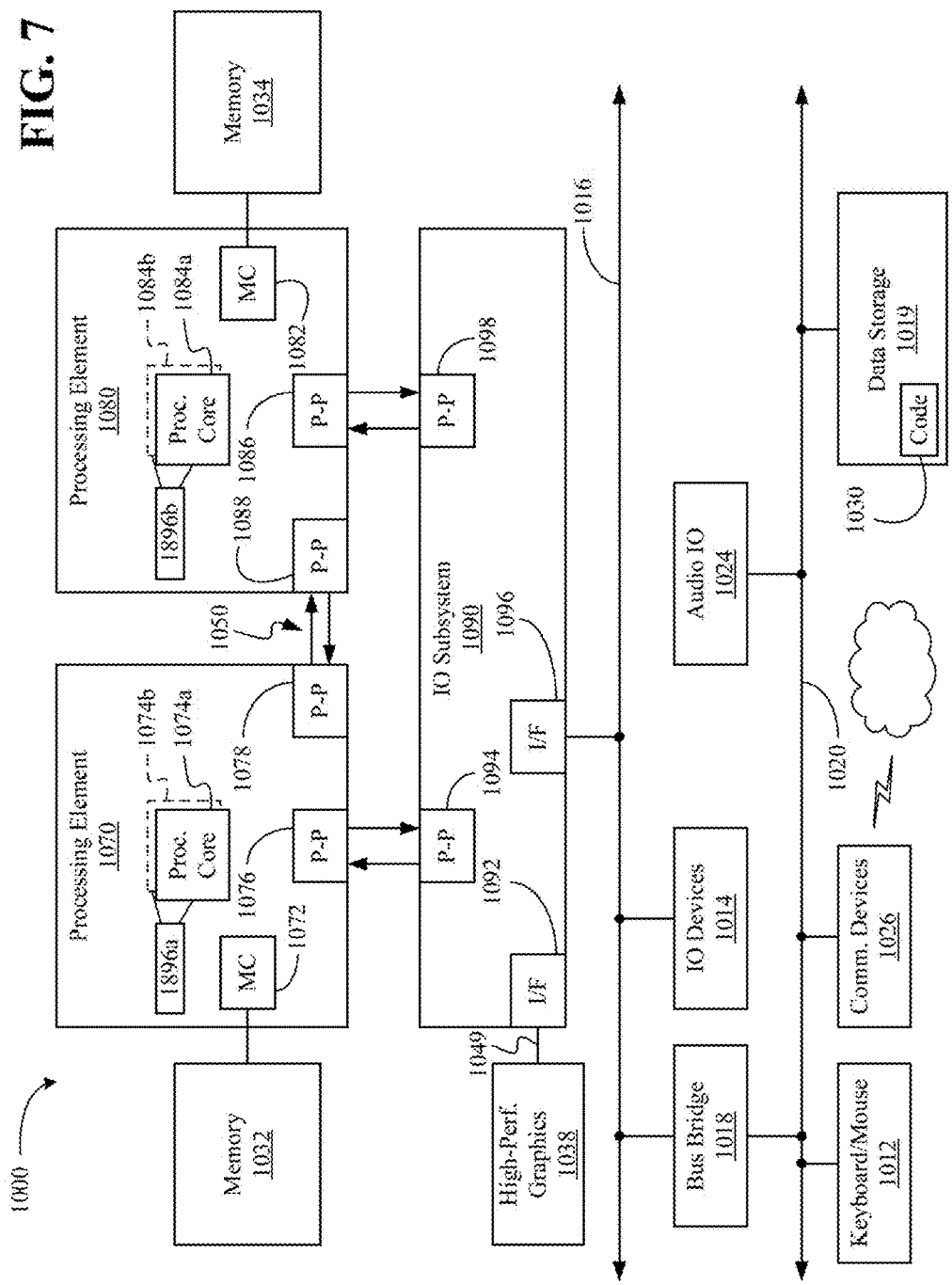

LOW POWER VOICE TRIGGER FOR FINDING MOBILE DEVICES

CROSS-REFERENCE TO RELATED APPLICATIONS

The present application claims the benefit of priority to U.S. Non-Provisional patent application Ser. No. 14/124,825 filed on Dec. 9, 2013, which claims benefit to International Patent Application No. PCT/US2013/059112 filed on Sep. 11, 2013.

TECHNICAL FIELD

Embodiments generally relate to the use of low power voice triggers to operate computing devices. More particularly, embodiments relate to the use of low power voice triggers to find mobile devices and automatically adapt the routing of computing device audio streams in the presence of wireless audio accessories.

BACKGROUND

Misplacing a mobile device such as a wireless smart phone or tablet may be a common occurrence, particularly given the increased popularity of these devices in modern society. In order to locate a misplaced mobile device, conventional solutions may involve the use of another device such as a separate phone or computer to call and/or text the misplaced mobile device, a radio frequency identifier (RFID) based device to detect an RFID tag installed on the misplaced mobile device, and so forth. The use of another device may be inconvenient and/or impractical, depending upon the circumstances. Other solutions may involve installing a location based application on the mobile device in advance of the device being misplaced. Such an approach may require the misplaced mobile device to be in an active mode in order for the application to function. In most cases, however, the mobile device enters a standby state once it has been misplaced for a certain amount of time, rendering the location based application inoperable.

BRIEF DESCRIPTION OF THE DRAWINGS

The various advantages of the embodiments will become apparent to one skilled in the art by reading the following specification and appended claims, and by referencing the following drawings, in which:

FIG. 7 is a block diagram of an example of a system according to an embodiment.

DESCRIPTION OF EMBODIMENTS

Figure 1:
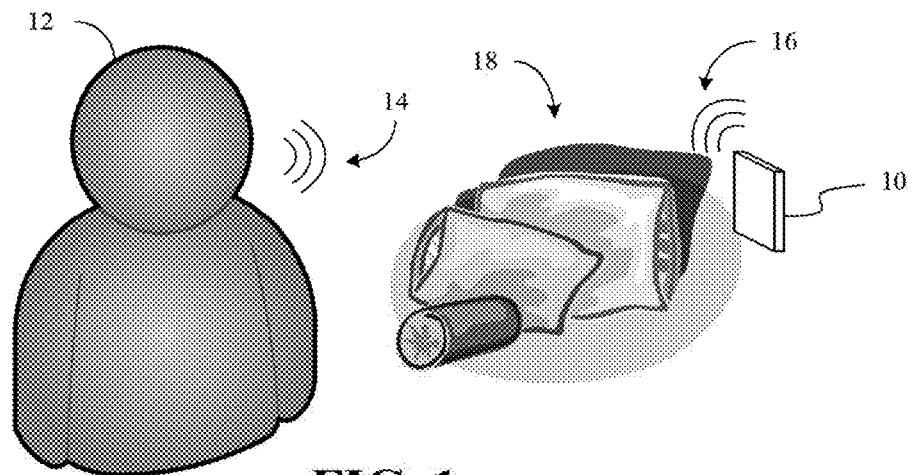
FIG. 1 is an illustration of an example of an approach to voice triggering a misplaced mobile device according to an embodiment.

Turning now to FIG. 1, a scenario is shown in which a mobile device 10 such as, for example, a wireless smart phone, tablet, personal digital assistant (PDA), mobile Internet device (MID), media player, etc., is misplaced by a user 12 of the mobile device 10. In the illustrated example, the user 12 speaks a predetermined phrase and/or audio pattern 14 such as, for example, the phrase "Hello phone", the phrase "Help me locate you", a whistle, etc., in order to initiate a device location session with respect to the mobile device 10. Other audio patterns such as, for example, a door closing may also be used to trigger the device location session.

The device location session may involve the mobile device 10 generating an output audio signal 16 that is audible to the user 12 even though the mobile device 10 is occluded by other objects 18 (e.g., pillows), located in another room, behind furniture, and so forth. As will be discussed in greater detail, the output audio signal 16 may include a tone, pre-recorded message, speech dialog/prompt, etc., wherein the user 12 may follow the sound of the output audio signal 16 to the mobile device 10, speak additional phrases in order to audibly interact with the mobile device 10, or any combination thereof. In addition to the audio output signal 16, the mobile device 10 may conduct other activities such as, for example, vibrating, generating one or more light effects and other programmable feedback to assist the user 12 during the device location session.

The mobile device 10 may have a host processor that is in a standby mode (e.g., host processor is powered off and the operating system/OS is not running). In such a case, the mobile device 10 may use a low power audio processor to monitor the surroundings for the predetermined audio pattern 14 while the host processor is in the standby mode. Moreover, the low power audio processor may either generate the output audio signal 16 during the device location session while the host processor remains in the standby mode or initiate an activation of the host processor and use software (e.g., speech dialog application, voice trigger service, driver, etc.) running on the host processor to generate the output audio signal 16 during the device location session. In one example, the standby mode may be a low power state such as the "S0i2" state of the Advanced Configuration and Power Interface (e.g., ACPI Specification, Rev. 5.0a, Dec. 6, 2011) standard, although other standby modes may be used.

Figure 2:
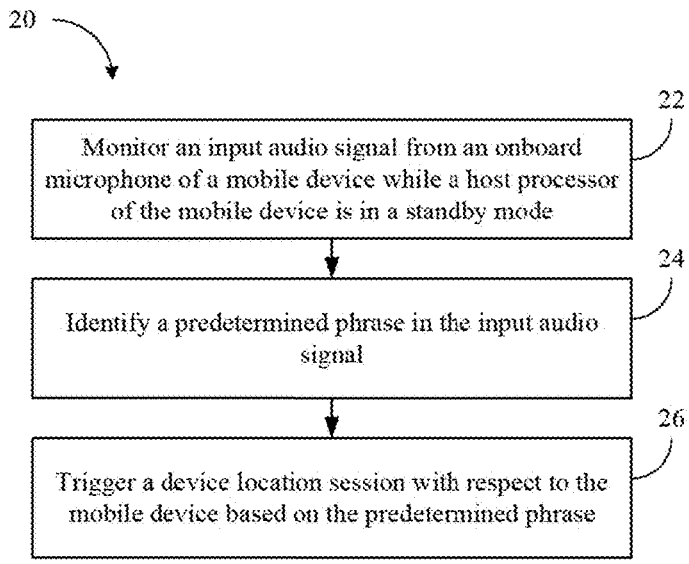
FIG. 2 is a flowchart of an example of a method of locating mobile devices according to an embodiment.

Turning now to FIG. 2, a method 20 of locating mobile devices is shown. The method 20 may be implemented as a set of logic instructions stored in a machine- or computer-readable storage medium such as random access memory (RAM), read only memory (ROM), programmable ROM (PROM), firmware, flash memory, etc., in configurable logic such as, for example, programmable logic arrays (PLAs), field programmable gate arrays (FPGAs), complex programmable logic devices (CPLDs), in fixed-functionality hardware logic using circuit technology such as, for example, application specific integrated circuit (ASIC), complementary metal oxide semiconductor (CMOS) or transistor-transistor logic (TTL) technology, or any combination thereof. For example, computer program code to carry out operations shown in method 20 may be written in any combination of one or more programming languages, including an object oriented programming language such as Java, Smalltalk, C++ or the like and conventional procedural programming languages, such as the "C" programming language or similar programming languages.

Illustrated processing block 22 provides for monitoring an input audio signal from an onboard microphone of a mobile device while a host processor of the mobile device is in a standby mode. Monitoring the input audio signal may involve implementing a low power solution that minimizes the potential impact on battery life. For example, a low power processor (e.g., digital signal processor/DSP operating at a relatively low frequency) might sample the input audio signal on an intermittent basis and reduce the power consumption of one or more audio front end components in between samples in order to reduce power consumption. A predetermined audio pattern may be identified in the input audio signal at block 24. The predetermined audio pattern might include a key phrase such as, for example, "Hello phone", and/or a command such as, for example, "Help me locate you".

Block 26 may trigger a device location session with respect to the mobile device based on the predetermined audio pattern. For example, if the predetermined audio pattern is a command such as "Help me locate you", the device location session might involve generating an output audio signal (e.g., tone, beacon) that may be audibly followed by the originator/source (e.g., user) of the predetermined audio pattern in order to locate the mobile device. Such an approach may be conducted without activating the host processor or OS. In this regard, a low power audio processor of the mobile device might be configured to recognize a relatively small number of predetermined audio patterns (e.g., five) without negatively impacting power consumption or battery life. As will be discussed in greater detail, a verification of the source of the predetermined audio pattern may also be conducted prior to generating the output audio signal in order to ensure that only authorized individuals may trigger device location sessions. In such a case, the voice of the user may be recorded and analyzed in advance, and compared to the voice of the originator of the predetermined audio pattern at the time of triggering the device location session.

The predetermined audio pattern may also be a key phrase such as "Hello phone", that enables the low power audio processor to determine that a device location session is being requested with respect to the particular mobile device in question (e.g., and not another device). In such a case, the low power audio processor might be configured to recognize only a single predetermined audio pattern and achieve even lower power consumption and longer battery life. In response to identifying the key phrase, the low power audio processor may initiate an activation of the host processor (e.g., via inter-processor communication/IPC, interrupt, etc.) and use software running on the host processor to generate the output audio signal during the device location session.

Triggering the device location session at block 26 may also be contingent upon context data from one or more sensors (e.g., ambient light sensors, accelerometers, and so forth) of the mobile device. For example, block 26 might be conducted only if the context data indicates that the mobile device has been unused and/or stationary for a predetermined period of time. Otherwise, it may be inferred that the predetermined audio pattern is a false positive and a device location session is not being requested.

Figure 3A:
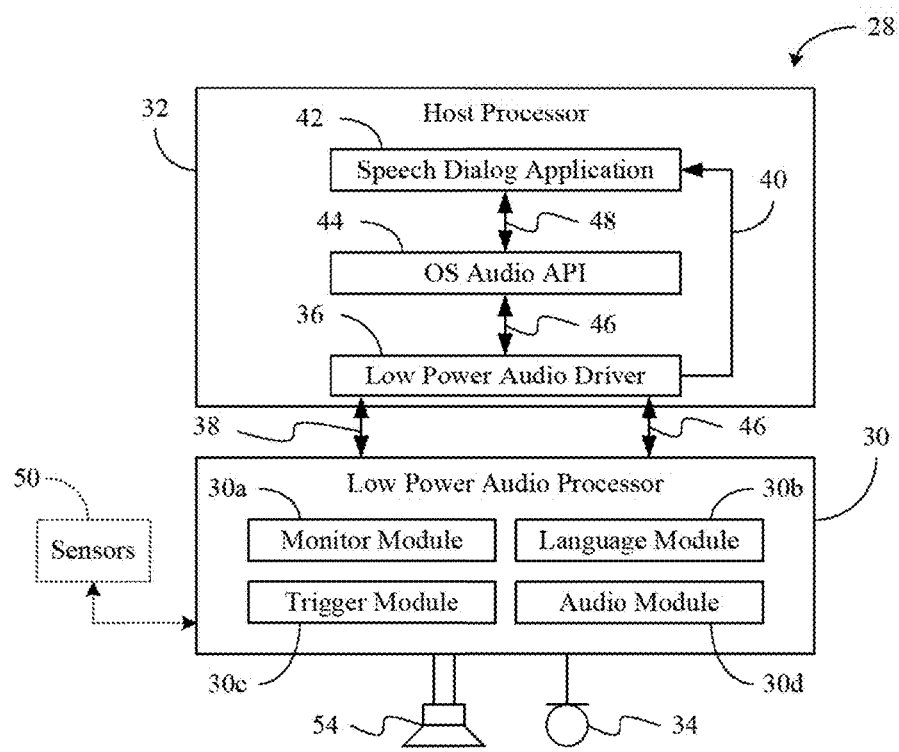
FIGS. 3A and 3B are block diagrams of examples of mobile device architectures according to an embodiment.

FIG. 3A shows a mobile device architecture 28 in which a low power audio processor 30 (30a-30d) functions as a firmware solution that enables low power operation when a host processor 32 (e.g., central processing unit/CPU) is initially in a standby mode. The illustrated low power audio processor 30 includes a monitor module 30a that monitors an input audio signal from an onboard microphone 34 of the mobile device while the host processor 32 is in the standby mode. A language module 30b may identify a predetermined audio pattern in the input audio signal, wherein a trigger module 30c may trigger a device location session with respect to the mobile device based on the predetermined audio pattern. In one example, the trigger module 30c initiates an activation of the host processor 32 and an audio module 30d uses software running on the host processor 32 to generate the output audio signal during the device location session.

For example, the host processor 32 may include a low power audio driver 36 that receives an IPC 38 from the trigger module 30c once the host processor 32 has been taken out of the standby mode. On receiving the IPC 38, the low power audio driver 36 may send a notification 40 (e.g., voice trigger/VT event) to a speech dialog application 42. The speech dialog application 42 may in turn open an audio capture pipeline via the audio module 30d using an OS audio application programming interface (API) 44. The speech dialog application 42 may also start a speech interaction with a user such as the user 12 (FIG. 1) via an audio stream 46. The audio stream 46 may include one or more speech commands and/or responses 48 that are transferred between the speech dialog application 42 and the user. The output audio signal containing the responses may be made audible to the user via an onboard speaker 54 (e.g., hands free loudspeaker/HFL, embedded earpiece, etc.). As will be discussed in greater detail, the output audio signal may be routed to the onboard speaker 54 even if a wireless audio accessory such as a Bluetooth (e.g., Institute of Electrical and Electronics Engineers/IEEE 802.15.1-2005, Wireless Personal Area Networks) headset is connected to the mobile device.

The determination of whether to trigger the device location session may also take into consideration context data from one or more sensors 50 (e.g., ambient light sensors, accelerometers, and so forth) on the mobile device, as already discussed. In such a case, the device location session may be triggered in response to detecting a predetermined audio pattern only if the context data indicates that the mobile device has been either unused or stationary for a predetermined period of time.

Figure 3B:
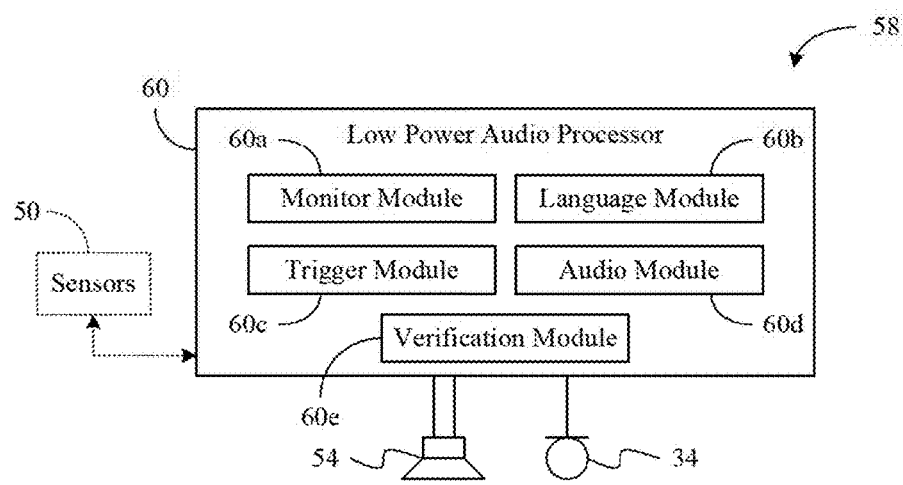

FIG. 3B shows a mobile device architecture 58 in which a low power audio processor 60 (60a-60e) functions as a firmware solution that enables low power operation while a host processor (not shown) remains in a standby mode. The illustrated low power audio processor 60 includes a monitor module 60a that monitors an input audio signal from an onboard microphone 34 of the mobile device while the host processor is in the standby mode. A language module 60b may identify a predetermined audio pattern in the input audio signal, wherein a trigger module 60c may trigger a device location session with respect to the mobile device based on the predetermined audio pattern. In one example, a verification module 60e verifies the source (e.g., user, originator) of the predetermined phase prior to generation of an output audio signal by an audio module 60d. The verification module 60e may therefore ensure that only authorized individuals may trigger device location sessions. As already noted, the determination of whether to trigger the device location session may also take into consideration context data from one or more sensors 50 (e.g., ambient light sensors, accelerometers, and so forth) on the mobile device.

Wireless Audio Accessories

A challenge may arise when a user tries to use predetermined audio pattern detection to trigger speech interaction with a computing device but a wireless audio accessory such as a Bluetooth headset is still connected to the computing device. To illustrate the challenge, imagine that a user leaves work, is driving in his or her car and has a Bluetooth headset connected to a wireless phone. The user might arrive at home, place the phone on the kitchen counter or living room table, and place the Bluetooth headset at some other location still in range of the phone without switching the headset off. If the user now speaks the predetermined audio pattern (e.g., "Hello phone") and a speech dialog application on the phone begins responding back to the user over the Bluetooth headset (as per convention), the user may not know why he or she is not hearing the response. Moreover, there may be no visual indication to the user that the phone is connected to the Bluetooth headset, since user is located relatively far from the phone and cannot see the display/screen of the phone. Such an occurrence may have a negative impact on user experience.

As will be discussed in greater detail, the onboard microphone may be kept on and listening for predetermined audio patterns even though a wireless audio accessory is connected to the computing device. Note that the user may also trigger speech interaction by pressing a button on the wireless audio accessory, in which case the audio capture may occur via the microphone of the wireless audio accessory and the audio response of the speech dialog application may occur through the speakers of the wireless audio accessory. Simply put, since the initial trigger originated from the wireless audio accessory in such a scenario, it may be a reasonable assumption that user wishes to use the wireless audio accessory.

If, on the other hand, the trigger occurs due to the detection of a predetermined audio pattern via an onboard microphone, the assumption may be that user wishes not to use the wireless audio accessory for speech interaction. Accordingly, the computing device may use the onboard microphone and onboard speakers for audio capture and audio responses, respectively. During this time, if an incoming phone call is received or there is a system alert, the onboard microphone and onboard speakers may be used for these applications as well. As will be discussed in greater detail, a voice trigger activity flag may be used to facilitate the audio routing determination.

Figure 4:
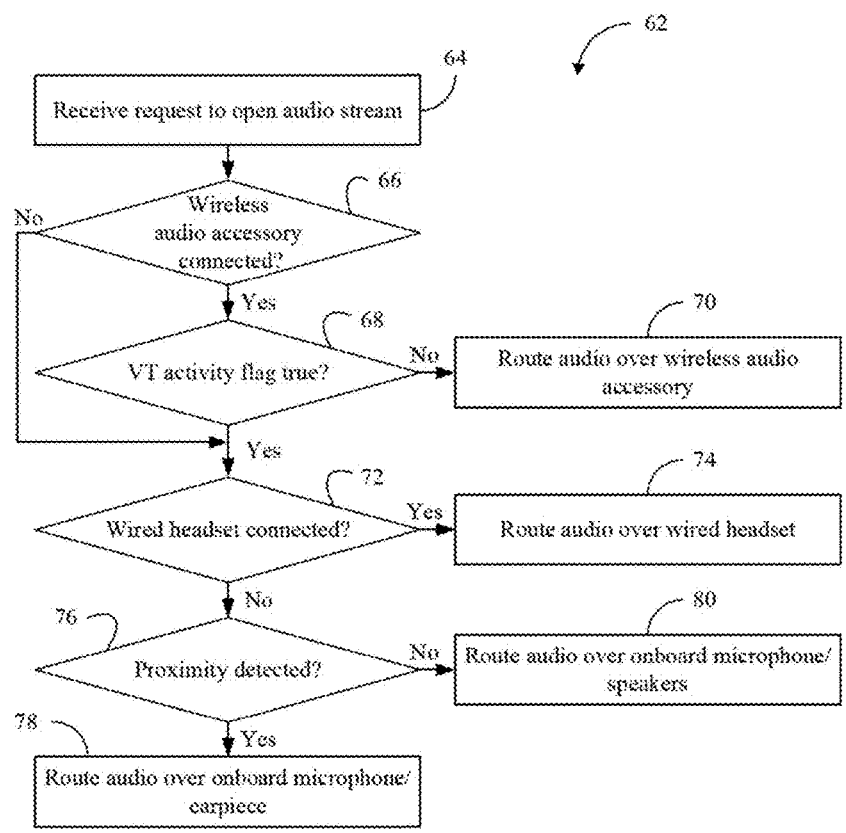
FIG. 4 is a flowchart of an example of a method of routing audio according to an embodiment.

FIG. 4 shows a method 62 of routing audio in a computing device having wireless audio accessory connectivity. The method 62 may be implemented as a set of logic instructions stored in a machine- or computer-readable storage medium such as RAM, ROM, PROM, firmware, flash memory, etc., in configurable logic such as, for example, PLAs, FPGAs, CPLDs, in fixed-functionality hardware logic using circuit technology such as, for example, ASIC, CMOS or TTL technology, or any combination thereof. For example, computer program code to carry out operations shown in method 62 may be written in any combination of one or more programming languages, including an object oriented programming language such as Java, Smalltalk, C++ or the like and conventional procedural programming languages, such as the "C" programming language or similar programming languages.

Illustrated processing block 64 provides for receiving a request to open an audio stream. The request may be associated with the placement of an outgoing call, the receipt of an incoming call, the playing of media content, the initiation of a device location session, and so forth. A determination may be made at block 66 as to whether a wireless audio accessory such as, for example, a Bluetooth headset, is connected to the mobile device. If so, illustrated block 68 determines whether a voice trigger (VT) activity flag is true. The flag may indicate whether the request at block 64 resulted from a predetermined audio pattern being detected via an onboard microphone of the computing device. If not, it may be inferred that the request resulted from the user pressing a button on the wireless audio accessory and block 70 may route input and output audio over the wireless audio accessory.

If either no wireless audio accessory is connected or the VT activity flag is true (e.g., the audio stream request resulted from a predetermined audio pattern being detected), audio may generally be routed to either an onboard speaker or a wired speaker of the computing device. In the illustrated example, block 72 determines whether a wired headset is connected to the computing device. If so, audio may be routed over the wired headset at block 74.

In this regard, if a wired headset is connected to a phone, then instead of using the onboard microphone and onboard speakers, the wired headset speakers and wired headset microphone (e.g., if present, to capture audio in conjunction with low power voice triggering) may be used. There may be enough visual indication from a distance that the headset is connected to the phone and so the user may expect that audio is directed to the headset. To elaborate, when a user speaks a predetermined audio pattern with a wired headset connected and does not hear the response back, the user may likely look towards the phone and see that it is connected to the wired headset. A speech command may also be added so that user can utter a phrase such as "Use loudspeaker" and the speech dialog application will then use the hands free loudspeaker instead of the wired headset speakers. Thus, the illustrated solution may make it easier for the user to use voice triggers and speech interaction without having to touch the device or look at the screen.

If no wired headset is connected, block 76 may determine whether proximity is detected between the user and the computing device (e.g., a device sensor determines whether the user's face is nearby). If so, audio may be routed over the onboard microphone and earpiece of the computing device at block 78. If proximity is not detected, illustrated block 80 routes audio over the onboard microphone and hands free loudspeaker of the computing device. The user may also configure whether voice triggering is to be used when the wireless audio accessory is connected. Such an approach may provide even greater flexibility to configure the above behavior.

Figure 5:
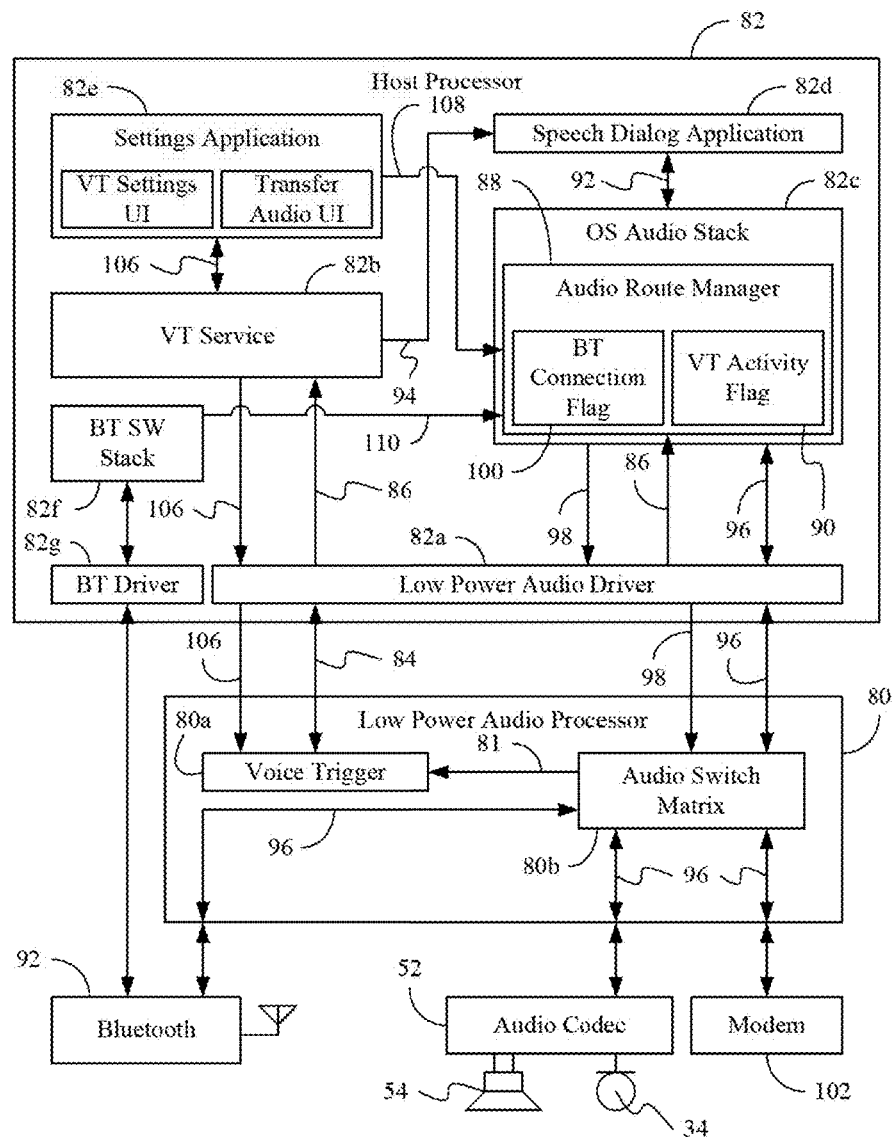
FIG. 5 is a block diagram of an example of a computing device architecture having wireless audio accessory connectivity according to an embodiment.

FIG. 5 shows a computing device architecture having wireless audio accessory connectivity. In the illustrated example, a low power audio processor 80 (80a, 80b) includes a voice trigger module 80a that may have functionality similar to that of the low power audio processor 30 (FIG. 3A), already discussed. Thus, the voice trigger module 80a may be configured to monitor an input audio signal 81 from an onboard microphone 34 of the computing device while a host processor 82 (82a-82g) of the computing device is in a standby mode. The voice trigger module 80a may also identify a predetermined audio pattern (e.g., key phrase, command, etc.) in the input audio signal and generate an IPC 84 in response to the predetermined audio pattern in order to activate the host processor 82.

A low power audio driver 82a may receive the IPC 84 and send a voice trigger (VT) notification 86 to a VT service 82b as well as an operating system (OS) audio stack 82c (e.g., audio hardware abstraction layer/HAL). An audio route manager 88 in the OS audio stack 82c may receive the VT notification 86 and set a VT activity flag 90 to "true" to indicate that the trigger occurred via the onboard microphone 34 (e.g., a voice trigger has initiated a request to open an audio stream on the computing device) rather than a Bluetooth interface 92.

When the VT service 82b issues a corresponding VT event 94 to a speech dialog application 82d, the application 82d may open an audio stream 96 via the OS audio stack 82c to communicate with the user. The illustrated audio route manager 88 checks the VT activity flag 90 in order to determine whether the activation of the host processor 82 was based on a predetermined audio pattern. If the VT activity flag 90 is "true", then the audio route manager 88 may generate routing instructions 98 that cause an audio switch matrix 80*b* to route the outgoing portion of the audio stream 96 from the speech dialog application 82*d* to the onboard speaker 54 (e.g., HFL, earpiece) and route the incoming portion of the audio stream 96 from the onboard microphone 34 to the speech dialog application 82*d*. The audio route manager 88 may also query a proximity sensor (not shown) to determine if the HFL or earpiece should be activated. Such a routing solution may be provided even though a Bluetooth connection state 110 provided by a Bluetooth software (SW) stack 82*f* has caused a Bluetooth connection flag 100 to indicate that a Bluetooth headset is connected to the Bluetooth interface 92 and a Bluetooth driver 82*g*.

The illustrated VT activity flag 90 stays "true" until there is an ongoing audio connection (e.g., voice and/or video call) via, for example, a modem 102 or the user changes the routing via a settings application 82*e*. In such a case, one or more VT settings 106 may be sent to the VT module 106 and a new routing policy 108 may be sent to the audio route manager 88 in order to route the audio stream 96 through the Bluetooth interface 92. In one example, the Bluetooth interface 92, an audio codec 52 and the modem 102 are coupled to the computing device architecture via synchronous serial ports (SSPs), which may be accessible by the low power processor 80, although other approaches may be used.

Figure 6:
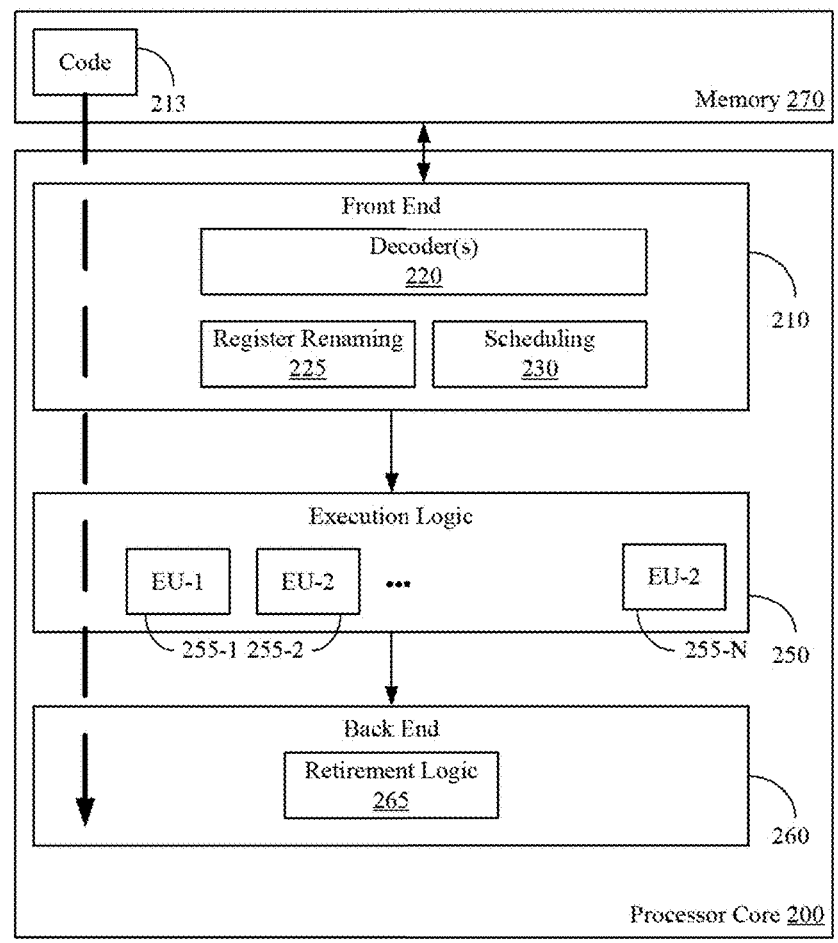
FIG. 6 is a block diagram of an example of a processor according to an embodiment.

FIG. 6 illustrates a processor core 200 according to one embodiment. The processor core 200 may be the core for any type of processor, such as a micro-processor, an embedded processor, a digital signal processor (DSP), a network processor, or other device to execute code. Although only one processor core 200 is illustrated in FIG. 6, a processing element may alternatively include more than one of the processor core 200 illustrated in FIG. 6. The processor core 200 may be a single-threaded core or, for at least one embodiment, the processor core 200 may be multithreaded in that it may include more than one hardware thread context (or "logical processor") per core.

FIG. 6 also illustrates a memory 270 coupled to the processor 200. The memory 270 may be any of a wide variety of memories (including various layers of memory hierarchy) as are known or otherwise available to those of skill in the art. The memory 270 may include one or more code 213 instruction(s) to be executed by the processor 200 core, wherein the code 213 may implement the method 20 (FIG. 2) and/or the method 62 (FIG. 4), already discussed. The processor core 200 follows a program sequence of instructions indicated by the code 213. Each instruction may enter a front end portion 210 and be processed by one or more decoders 220. The decoder 220 may generate as its output a micro operation such as a fixed width micro operation in a predefined format, or may generate other instructions, microinstructions, or control signals which reflect the original code instruction. The illustrated front end 210 also includes register renaming logic 225 and scheduling logic 230, which generally allocate resources and queue the operation corresponding to the convert instruction for execution.

The processor 200 is shown including execution logic 250 having a set of execution units 255-1 through 255-N. Some embodiments may include a number of execution units dedicated to specific functions or sets of functions. Other embodiments may include only one execution unit or one execution unit that can perform a particular function. The illustrated execution logic 250 performs the operations specified by code instructions.

After completion of execution of the operations specified by the code instructions, back end logic 260 retires the instructions of the code 213. In one embodiment, the processor 200 allows out of order execution but requires in order retirement of instructions. Retirement logic 265 may take a variety of forms as known to those of skill in the art (e.g., re-order buffers or the like). In this manner, the processor core 200 is transformed during execution of the code 213, at least in terms of the output generated by the decoder, the hardware registers and tables utilized by the register renaming logic 225, and any registers (not shown) modified by the execution logic 250.

Although not illustrated in FIG. 6, a processing element may include other elements on chip with the processor core 200. For example, a processing element may include memory control logic along with the processor core 200. The processing element may include I/O control logic and/or may include I/O control logic integrated with memory control logic. The processing element may also include one or more caches.

Referring now to FIG. 7, shown is a block diagram of a system 1000 embodiment in accordance with an embodiment. Shown in FIG. 7 is a multiprocessor system 1000 that includes a first processing element 1070 and a second processing element 1080. While two processing elements 1070 and 1080 are shown, it is to be understood that an embodiment of the system 1000 may also include only one such processing element.

The system 1000 is illustrated as a point-to-point interconnect system, wherein the first processing element 1070 and the second processing element 1080 are coupled via a point-to-point interconnect 1050. It should be understood that any or all of the interconnects illustrated in FIG. 7 may be implemented as a multi-drop bus rather than point-to-point interconnect.

As shown in FIG. 7, each of processing elements 1070 and 1080 may be multicore processors, including first and second processor cores (i.e., processor cores 1074*a* and 1074*b* and processor cores 1084*a* and 1084*b*). Such cores 1074, 1074*b*, 1084*a*, 1084*b* may be configured to execute instruction code in a manner similar to that discussed above in connection with FIG. 6.

Each processing element 1070, 1080 may include at least one shared cache 1896*a*, 1896*b*. The shared cache 1896*a*, 1896*b* may store data (e.g., instructions) that are utilized by one or more components of the processor, such as the cores 1074*a*, 1074*b* and 1084*a*, 1084*b*, respectively. For example, the shared cache 1896*a*, 1896*b* may locally cache data stored in a memory 1032, 1034 for faster access by components of the processor. In one or more embodiments, the shared cache 1896*a*, 1896*b* may include one or more mid-level caches, such as level 2 (L2), level 3 (L3), level 4 (L4), or other levels of cache, a last level cache (LLC), and/or combinations thereof.

While shown with only two processing elements 1070, 1080, it is to be understood that the scope of the embodiments are not so limited. In other embodiments, one or more additional processing elements may be present in a given processor. Alternatively, one or more of processing elements 1070, 1080 may be an element other than a processor, such as an accelerator or a field programmable gate array. For example, additional processing element(s) may include additional processors(s) that are the same as a first processor 1070, additional processor(s) that are heterogeneous or asymmetric to processor a first processor 1070, accelerators (such as, e.g., graphics accelerators or digital signal processing (DSP) units), field programmable gate arrays, or any other processing element. There can be a variety of differences between the processing elements 1070, 1080 in terms of a spectrum of metrics of merit including architectural, micro architectural, thermal, power consumption characteristics, and the like. These differences may effectively manifest themselves as asymmetry and heterogeneity amongst the processing elements 1070, 1080. For at least one embodiment, the various processing elements 1070, 1080 may reside in the same die package.

The first processing element 1070 may further include memory controller logic (MC) 1072 and point-to-point (P-P) interfaces 1076 and 1078. Similarly, the second processing element 1080 may include a MC 1082 and P-P interfaces 1086 and 1088. As shown in FIG. 7, MC's 1072 and 1082 couple the processors to respective memories, namely a memory 1032 and a memory 1034, which may be portions of main memory locally attached to the respective processors. While the MC 1072 and 1082 is illustrated as integrated into the processing elements 1070, 1080, for alternative embodiments the MC logic may be discrete logic outside the processing elements 1070, 1080 rather than integrated therein.

The first processing element 1070 and the second processing element 1080 may be coupled to an I/O subsystem 1090 via P-P interconnects 1076 1086, respectively. As shown in FIG. 7, the I/O subsystem 1090 includes P-P interfaces 1094 and 1098. Furthermore, I/O subsystem 1090 includes an interface 1092 to couple I/O subsystem 1090 with a high performance graphics engine 1038. In one embodiment, bus 1049 may be used to couple the graphics engine 1038 to the I/O subsystem 1090. Alternately, a point-to-point interconnect may couple these components.

In turn, I/O subsystem 1090 may be coupled to a first bus 1016 via an interface 1096. In one embodiment, the first bus 1016 may be a Peripheral Component Interconnect (PCI) bus, or a bus such as a PCI Express bus or another third generation I/O interconnect bus, although the scope of the embodiments are not so limited.

As shown in FIG. 7, various I/O devices 1014 (e.g., cameras) may be coupled to the first bus 1016, along with a bus bridge 1018 which may couple the first bus 1016 to a second bus 1020. In one embodiment, the second bus 1020 may be a low pin count (LPC) bus. Various devices may be coupled to the second bus 1020 including, for example, a keyboard/mouse 1012, network controllers/communication device(s) 1026 (which may in turn be in communication with a computer network), and a data storage unit 1019 such as a disk drive or other mass storage device which may include code 1030, in one embodiment. The code 1030 may include instructions for performing embodiments of one or more of the methods described above. Thus, the illustrated code 1030 may implement the method 20 (FIG. 2) and/or the method 62 (FIG. 4), already discussed, and may be similar to the code 213 (FIG. 6), already discussed. Further, an audio I/O 1024 may be coupled to second bus 1020.

Note that other embodiments are contemplated. For example, instead of the point-to-point architecture of FIG. 7, a system may implement a multi-drop bus or another such communication topology. Also, the elements of FIG. 7 may alternatively be partitioned using more or fewer integrated chips than shown in FIG. 7.

Additional Notes and Examples

Example 1 may include an apparatus to locate a wireless device, comprising a monitor module to monitor an input audio signal from an onboard microphone of the mobile device while a host processor of the mobile device is in a standby mode, a language module to identify a predetermined audio pattern in the input audio signal, and a trigger module to trigger a device location session with respect to the mobile device based on the predetermined audio pattern.

Example 2 may include the apparatus of Example 1, further including an audio module to generate an output audio signal during the device location session.

Example 3 may include the apparatus of Example 2, further including a verification module to verify a source of the predetermined audio pattern prior to generation of the output audio signal.

Example 4 may include the apparatus of Example 1, wherein the trigger module is to initiate an activation of the host processor and use software running on the host processor to generate an output audio signal during the device location session.

Example 5 may include the apparatus of Example 4, further including an audio route manager to determine that a wireless audio accessory is connected to the mobile device and route the output audio signal to an onboard speaker of the mobile device if the activation of the host processor was based on the predetermined audio pattern.

Example 6 may include the apparatus of Example 5, wherein the audio route manager is to check a voice trigger activity flag to determine whether the activation of the host processor was based on the predetermined audio pattern.

Example 7 may include the apparatus of any one of Examples 1 to 6, wherein the trigger module is to trigger the device location session further based on context data from one or more sensors on the mobile device.

Example 8 may include the apparatus of Example 7, wherein the trigger module is to trigger the device location session in response to the predetermined audio pattern if the context data indicates that the mobile device has been either unused or stationary for a predetermined period of time.

Example 9 may include a method of locating a mobile device, comprising monitoring an input audio signal from an onboard microphone of the mobile device while a host processor of the mobile device is in a standby mode, identifying a predetermined audio pattern in the input audio signal, and triggering a device location session with respect to the mobile device based on the predetermined audio pattern.

Example 10 may include the method of Example 9, further including generating an output audio signal during the device location session.

Example 11 may include the method of Example 10, further including verifying a source of the predetermined audio pattern prior to generation of the output audio signal.

Example 12 may include the method of Example 9, further including initiating an activation of the host processor, and using software running on the host processor to generate an output audio signal during the device location session.

Example 13 may include the method of Example 12, further including determining that a wireless audio accessory is connected to the mobile device, and routing the output audio signal to an onboard speaker of the mobile device if the activation of the host processor was based on the predetermined audio pattern.

Example 14 may include the method of Example 13, further including checking a voice trigger activity flag to determine whether the activation of the host processor was based on the predetermined audio pattern.

Example 15 may include the method of any one of Examples 9 to 14, wherein the device location session is triggered further based on context data from one or more sensors on the mobile device.

Example 16 may include the method of Example 15, wherein the device location session is triggered in response to the predetermined audio pattern if the context data indicates that the mobile device has been either unused or stationary for a predetermined period of time.

Example 17 may include at least one computer readable storage medium comprising a set of instructions which, if executed by a mobile device, cause the mobile device to monitor an input audio signal from an onboard microphone of the mobile device while a host processor of the mobile device is in a standby mode, identify a predetermined audio pattern in the input audio signal, and trigger a device location session with respect to the mobile device based on the predetermined audio pattern.

Example 18 may include the at least one computer readable storage medium of Example 17, wherein the instructions, if executed, cause the mobile device to generate an output audio signal during the device location session.

Example 19 may include the at least one computer readable storage medium of Example 18, wherein the instructions, if executed, cause the mobile device to verify a source of the predetermined audio pattern prior to generation of the output audio signal.

Example 20 may include the at least one computer readable storage medium of Example 17, wherein the instructions, if executed, cause the mobile device to initiate an activation of the host processor, and use software running on the host processor to generate an output audio signal during the device location session.

Example 21 may include the at least one computer readable storage medium of Example 20, wherein the instructions, if executed, cause the mobile device to determine that a wireless audio accessory is connected to the mobile device, and route the output audio signal to an onboard speaker of the mobile device if the activation of the host processor was based on the predetermined audio pattern.

Example 22 may include the at least one computer readable storage medium of Example 21, wherein the instructions, if executed, cause the mobile device to check a voice trigger activity flag to determine whether the activation of the host processor was based on the predetermined audio pattern.

Example 23 may include the at least one computer readable storage medium of any one of Examples 17 to 22, wherein the device location session is to be triggered further based on context data from one or more sensors on the mobile device.

Example 24 may include the at least one computer readable storage medium of Example 23, wherein the device location session is to be triggered in response to the predetermined audio pattern if the context data indicates that the mobile device has been either unused or stationary for a predetermined period of time.

Example 25 may include an apparatus to route audio, comprising an audio route manager to receive a request to open an audio stream on a mobile device, determine that a wireless audio accessory is connected to the mobile device, and route the audio stream over one of a wired headset or an onboard speaker of the mobile device if the request to open the audio stream corresponds to a voice trigger containing a predetermined audio pattern.

Example 26 may include the apparatus of Example 25, wherein the audio route manager is to check a voice trigger activity flag to determine whether the request to open the audio stream corresponds to the voice trigger.

Example 27 may include a method of routing audio, comprising receiving a request to open an audio stream on a mobile device, determining that a wireless audio accessory is connected to the mobile device, and routing the audio stream over one of a wired headset or an onboard speaker of the mobile device if the request to open the audio stream corresponds to a voice trigger containing a predetermined audio pattern.

Example 28 may include the method of Example 27, further including checking a voice trigger activity flag to determine whether the request to open the audio stream corresponds to the voice trigger.

Example 29 may include at least one computer readable storage medium comprising a set of instructions which, if executed by a mobile device, cause the mobile device to receive a request to open an audio stream on a mobile device, determine that a wireless audio accessory is connected to the mobile device, and route the audio stream over one of a wired headset or an onboard speaker of the mobile device if the request to open the audio stream corresponds to a voice trigger containing a predetermined audio pattern.

Example 30 may include the at least one computer readable storage medium of Example 29, wherein the instructions, if executed, cause the mobile device to check a voice trigger activity flag to determine whether the request to open the audio stream corresponds to the voice trigger.

Example 31 may include an apparatus to locate a wireless device, comprising means for performing the method of any one of Examples 9 to 16.

Example 32 may include an apparatus to route audio, comprising means for performing the method of any one of Examples 27 or 28.

Thus, techniques described herein may enable devices to listen in low power mode for specific phrases using a relatively small speech recognition module running in a low power audio DSP. If the device detects that the phrase has been spoken by the user, the device may assume that the user is addressing the device in question. The device may then use the phrase, or a speech command following the phrase, to respond back to the user by either generating a tone or other type of audio response. Accordingly, the user may follow the audible sound to locate the device. Such an approach may obviate any need for a separate phone or computer to call and/or text the misplaced device. Additionally, additional technology such as RFID technology may also be eliminated. Moreover, the techniques may provide for device location even when the device is in standby mode.

Embodiments are applicable for use with all types of semiconductor integrated circuit ("IC") chips. Examples of these IC chips include but are not limited to processors, controllers, chipset components, programmable logic arrays (PLAs), memory chips, network chips, systems on chip (SoCs), SSD/NAND controller ASICs, and the like. In addition, in some of the drawings, signal conductor lines are represented with lines. Some may be different, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

Example sizes/models/values/ranges may have been given, although embodiments are not limited to the same. As manufacturing techniques (e.g., photolithography) mature over time, it is expected that devices of smaller size could be manufactured. In addition, well known power/ground connections to IC chips and other components may or may not be shown within the figures, for simplicity of illustration and discussion, and so as not to obscure certain aspects of the embodiments. Further, arrangements may be shown in block diagram form in order to avoid obscuring embodiments, and also in view of the fact that specifics with respect to implementation of such block diagram arrangements are highly dependent upon the platform within which the embodiment is to be implemented, i.e., such specifics should be well within purview of one skilled in the art. Where specific details (e.g., circuits) are set forth in order to describe example embodiments, it should be apparent to one skilled in the art that embodiments can be practiced without, or with variation of, these specific details. The description is thus to be regarded as illustrative instead of limiting.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. may be used herein only to facilitate discussion, and carry no particular temporal or chronological significance unless otherwise indicated.

As used in this application and in the claims, a list of items joined by the term "one or more of" may mean any combination of the listed terms. For example, the phrases "one or more of A, B or C" may mean A; B; C; A and B; A and C; B and C; or A, B and C.

Those skilled in the art will appreciate from the foregoing description that the broad techniques of the embodiments can be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

We claim:

1. A mobile computing device comprising:
a battery;
a display;
a microphone;
a speaker;
memory;
a first processor, the first processor to enter a first power state from a second power state, wherein the first power state is a lower power state relative to the second power state; and
a second processor, wherein the second processor is an audio digital signal processor (DSP), the second processor to use the microphone of the mobile computing device to monitor for a predetermined audio pattern when the first processor is in the first power state even when a wireless audio accessory having a microphone is connected to the mobile computing device, wherein the predetermined audio pattern includes a request by a user for help to locate the mobile computing device;

the second processor, in response to identification of the predetermined audio pattern, to cause sound to be output from the speaker of the mobile computing device to assist the user to locate the mobile computing device.

2. The mobile computing device of claim 1, wherein the first processor is a central processing unit (CPU).

3. The mobile computing device of claim 1, wherein the second processor is to record a voice of the user to monitor for the predetermined audio pattern.

4. The mobile computing device of claim 1, wherein the second processor is to analyze a voice of the user to monitor for the predetermined audio pattern.

5. The mobile computing device of claim 1, wherein the sound to be output from the speaker of the mobile computing device is a message.

6. The mobile computing device of claim 1, wherein the second processor is to cause, in addition to sound to be output from the speaker of the mobile computing device, other activity in response to identification of the predetermined audio pattern.

7. The mobile computing device of claim 6, wherein the other activity includes generation of one or more light effects.

8. The mobile computing device of claim 6, wherein the other activity includes vibration.

9. The mobile computing device of claim 1, wherein the second processor, in response to identification of the predetermined audio pattern, is to generate an audio output signal to cause the sound to be output from the speaker of the mobile computing device.

10. The mobile computing device of claim 1, wherein the second processor, in response to identification of the predetermined audio pattern, is to activate the first processor to cause the first processor to generate an audio output signal to cause the sound to be output from the speaker of the mobile computing device.

11. The mobile computing device of claim 1, wherein the wireless audio accessory is a Bluetooth headset.

12. The mobile computing device of claim 1, wherein the second processor, in response to identification of the predetermined audio pattern, is to cause sound to be output from the speaker of the mobile computing device even when a wireless audio accessory having a speaker is connected to the mobile computing device.

13. The mobile computing device of claim 12, wherein the wireless audio accessory is a Bluetooth headset.

14. A method to assist a user to locate a mobile computing device comprising a microphone and a speaker, the method comprising:
causing a first processor of the mobile computing device to enter a first power state from a second power state, wherein the first power state is a lower power state relative to the second power state;
monitoring by a second processor of the mobile computing device for a predetermined audio pattern using the microphone of the mobile computing device when the first processor is in the first power state even when a wireless audio accessory having a microphone is connected to the mobile computing device, wherein the second processor is an audio digital signal processor (DSP) and wherein the predetermined audio pattern includes a request by the user for help to locate the mobile computing device; and
causing by the second processor, in response to identification of the predetermined audio pattern, sound to be output from the speaker of the mobile computing device to assist the user to locate the mobile computing device.

15. The method of claim 14, wherein the first processor is a central processing unit (CPU).

16. The method of claim 14, comprising:
recording by the second processor a voice of the user to monitor for the predetermined audio pattern.

17. The method of claim 14, comprising:
analyzing by the second processor a voice of the user to monitor for the predetermined audio pattern.

18. The method of claim 14, wherein the sound to be output from the speaker of the mobile computing device is a message.

19. The method of claim 14, comprising:
causing by the second processor, in addition to sound to be output from the speaker of the mobile computing device, other activity in response to identification of the predetermined audio pattern.

20. The method of claim 19, wherein the other activity includes generation of one or more light effects.

21. The method of claim 19, wherein the other activity includes vibration.

22. The method of claim 14, wherein the causing sound to be output from the speaker of the mobile computing device comprises generating by the second processor an audio output signal in response to identification of the predetermined audio pattern to cause the sound to be output from the speaker of the mobile computing device.

23. The method of claim 14, wherein the causing sound to be output from the speaker of the mobile computing device comprises activating the first processor by the second processor to cause the first processor to generate an audio output signal to cause the sound to be output from the speaker of the mobile computing device.

24. The method of claim 14, wherein the wireless audio accessory is a Bluetooth headset.

25. The method of claim 14, wherein causing sound to be output from the speaker of the mobile computing device comprises causing by the second processor sound to be output from the speaker of the mobile computing device even when a wireless audio accessory having a speaker is connected to the mobile computing device.

26. The method of claim 25, wherein the wireless audio accessory is a Bluetooth headset.

* * * * *